United States Patent [19]  [11] 3,872,136
Middelhoek  [45] Mar. 18, 1975

[54] PROCESS FOR THE PREPARATION OF VANADIUM OXYCARBIDE, OXYNITRIDE AND OXYCARBONITRIDE

[75] Inventor: Servaas Middelhoek, Arnhem, Netherlands

[73] Assignee: N. V. Hollandse Metallurgische Industrie Billiton, Arnhem, Netherlands

[22] Filed: Sept. 9, 1970

[21] Appl. No.: 70,887

[30] Foreign Application Priority Data
Sept. 9, 1969  Netherlands ...................... 6913685

[52] U.S. Cl. .................. 423/371, 106/43, 423/352, 423/365, 423/409, 423/415, 423/440
[51] Int. Cl. ............................................. C01b 21/10
[58] Field of Search ............. 23/16, 21, 191, 208 A, 23/359; 423/352, 365, 371, 415, 409, 440; 106/43

[56] References Cited
UNITED STATES PATENTS

| | | | |
|---|---|---|---|
| 3,077,385 | 2/1963 | Robb | 23/208 A |
| 3,334,992 | 8/1967 | Downing et al. | 23/208 A X |
| 3,342,553 | 9/1967 | Buker et al. | 23/208 A |
| 3,389,957 | 6/1968 | Olds et al. | 23/359 X L |
| 3,416,891 | 12/1968 | Roubin et al. | 23/191 |
| 3,492,100 | 1/1970 | Roubin et al. | 23/315 |
| 3,716,627 | 2/1973 | Middelhoek | 423/440 |
| 3,745,209 | 7/1973 | Middelhoek | 423/371 |

OTHER PUBLICATIONS
Rene, Chem. Abs., Vol. 71, para. 103673 s (1969).
Schwarzkopf et al., "Refractory Hard Metals," 1953, pp. 101–107.

*Primary Examiner*—Walter R. Satterfield
*Attorney, Agent, or Firm*—James M. Heilman; William O. Heilman; Anthony J. Casella

[57] ABSTRACT

A process for the preparation of a material, consisting of at least one vanadium compound having the formula $VC_xN_y$ wherein $x$ and $y$ have any desired ratio to one another and $x$ or $y$ may equal zero, except that when $y$ is 0, $x$ cannot be 0, and vice versa, by reacting at a high temperature a solid material consisting chiefly of vanadium oxycarbide and gas comprising 0–100 vol. % hydrogen, 0–100 vol. % nitrogen, and 0–100 vol. % ammonia, the sum of the hydrogen, nitrogen and ammonia contents constituting at least 50 vol. % of the gas.

The product has utility as an alloying agent for the addition of vanadium and optionally, nitrogen, to molten steel.

13 Claims, No Drawings

PROCESS FOR THE PREPARATION OF VANADIUM OXYCARBIDE, OXYNITRIDE AND OXYCARBONITRIDE

A process for the preparation of a material consisting of at least one vanadium compound having the formula $VC_xN_y$ wherein $x$ and $y$ have any desired ratio to one another and $x$ or $y$ may equal zero, except, that when $y$ is 0, $x$ cannot be 0 and vice versa; by reacting at a high temperature a solid material consisting chiefly of vanadium oxycarbide and gas comprising 0–100 vol.% hydrogen, 0–100 nitrogen, and 0–100 vol.% ammonia, the sum of the hydrogen, nitrogen and ammonia contents constituting at least 50 vol. % of the gas.

The product has utility as an alloying agent for the addition of vanadium and optionally, nitrogen to molten steel.

This invention relates to a process for the preparation of a material consisting of at least one vanadium compound having the formula $VC_xN_y$, wherein $x$ and $y$ may have any desired ratio to one another and $x$ and $y$ may equal 0, but not simultaneously.

The material is useful as an alloying agent for the addition of vanadium and possibly nitrogen to molten steel.

The invention provides an inexpensive process for the preparation of such a material by reacting at a high temperature a material containing essentially vanadium oxycarbide with a gas containing from 0–100 vol. % hydrogen 0–100 vol. % nitrogen and from 0–100 vol. % ammonia, the sum of the hydrogen, nitrogen and ammonia contents constituting at least 50 vol. % of the gas.

Besides vanadium oxycarbide the starting material may contain other components, e.g. free (i.e. not chemically combined) carbon, that may be present as a desirable addition and/or as a consequence of the method of preparation of the vanadium oxycarbide. The starting material may be prepared by different methods. It may be prepared by mixing oxidic vanadium-containing material and a proper amount of carbon and heating the mixture. Advantageously, vanadium oxycarbide may be prepared by reacting oxidic vanadium-containing material with a gas containing one or more hydrocarbons (preferably methane).

The expression "vanadium oxycarbide" comprises compounds of the general formula $VO_p C_q$ wherein $p$ and $q$ may have any ratio to one another and both $p$ and $q$ differ from 0. Preferably, $q$ is at least equal to $p$. However, it is possible to carry out the process according to the invention using an oxycarbide wherein $q$ is smaller than $p$.

The vanadium oxycarbide may also contain combined nitrogen, which depends on the reaction conditions used in preparing the vanadiumoxycarbide. Generally, the nitrogen content does not exceed 3 percent by weight.

If the reaction gas consists mainly of hydrogen and does not contain any nitrogen or ammonia, the product will be vanadium carbide. If a reaction gas is used which consists mainly of a mixture of hydrogen and nitrogen and/or ammonia or which consists mainly of nitrogen and/or ammonia, the product will consist (depending on the chosen reaction circumstances) of a mixture of vanadium carbonitride and vanadium-carbide and/or nitride, or a mixture of vanadium nitride and vanadium carbide, or even of vanadium nitride, practically without combined carbon.

If so desired, some hydrocarbon (preferably methane but butane and propane can also be used) may be added to the reaction gas, which may lead to introduction of extra carbon to the reaction material. Preferably, this will be done in case the starting material contains vanadium oxycarbide ($VO_pC_q$) wherein $q$ is smaller than $p$. In this way also a product containing free carbon may be prepared. The amount of hydrocarbon added to the reaction gas preferably does not exceed 10 vol. %

The gaseous reaction mixture may also contain other gases which do not interfere with the reaction. However, it is preferred to employ a reaction mixture in which the sum of the hydrogen, nitrogen and ammonia contents represents at least 80 vol. % of the gas.

The method according to the invention is preferably carried out at a temperature between 800° and 1,250°C. with "hold" periods at 1,050°C, 1,150°C., or 1,250°C. Fluid bed as moving bed processes may be used. It should be noted that rotary tubular furnaces and shaft furnaces are also suitable.

The invention is further illustrated but not limited by the following examples:

EXAMPLE I

Pure hydrogen was passed over vanadium oxycarbide containing 69.9 per cent by weight vanadium and 14.9 per cent by wt. oxygen at a temperature of 1150°C for 6 ¾ hours. The resulting product contained 1.3% by weight oxygen and 12.7 per cent by weight carbon.

EXAMPLE II

Seven litres of natural gas were passed in one hour over 10 grams of technical trade vanadium pentoxide at 1,050°C. Then at the same temperature 4 litres of natural gas were passed over the material for another hour. The oxycarbide formed contained 72.2 per cent by weight vanadium, 16.9 per cent by weight carbon and 10.5 per cent by weight oxygen. Over this material pure hydrogen was passed for 7 hours at a rate of 20 litres per hour, at a temperature of 1,250°C. The resulting product contained 82.6 per cent by weight vanadium, 14.9 per cent by weight carbon and 0.8 per cent by weight oxygen, the latter two contents having been lowered.

EXAMPLE III

Eleven litres of natural gas were passed in 1 hour over 10 grams of technical grade vanadium pentoxide at 1,050°C. Then at the same temperature, 0.2 litres of natural gas were passed over for another hour. The reacted material contained 72.9 per cent by weight vanadium, 14.8 per cent by weight carbon and 10.7 per cent by weight oxygen. Over this material pure hydrogen was passed for 7 hours in an amount of 20 litres per hour. For the first three hours the temperature was maintained at 1,050°C. The remaining 4 hours the temperature was 1,150°C. The resulting product contained 82.2 per cent by weight vanadium, 16.0 per cent by weight carbon and 0.4 per cent by weight oxygen.

The natural gas used in the Example and in Example (II) was natural gas from Slochteren, consisting of approximately 85% methane and 15% notrogen.

EXAMPLE IV

A mixture of hydrogen and nitrogen in the ratio 1 : 1 was passed for 7 hours over vanadium oxycarbide containing 77.8 per cent by weight vanadium, 10.2 per cent by weight carbon and 10.1 per cent by weight oxygen. The temperature was maintained at 1,050°C.

The resulting product had the following analysis:

79.3 per cent by weight of vanadium
14.4 per cent by weight of nitrogen
4.7 per cent by weight of carbon
0.2 per cent weight of oxygen.

EXAMPLE V

A mixture of hydrogen and nitrogen in the ratio 1 : 1 was passed for 7 hours over vanadium oxycarbide of the same composition as the oxycarbide used in Example (IV). The temperature was maintained at 1,150°C.

The resulting product had the following analysis:

81.2 per cent by weight of vanadium
8.5 per cent by weight of nitrogen
8.5 per cent by weight of carbon
0.5 per cent by weight of oxygen.

EXAMPLE VI

Pure nitrogen was passed for 7 hours over vanadium oxycarbide containing 78.7 per cent by weight vanadium, 7.3 per cent by weight oxygen, 10.9 per cent by weight carbon and 1.6 per cent by weight nitrogen. The temperature was maintained at 1,050°C.

The resulting product had the following analysis:

79.1 per cent by weight of vanadium
13.2 per cent by weight of nitrogen
4.5 per cent by weight of carbon
1.7 per cent by weight of oxygen.

EXAMPLE VII

The procedure of Example VI was repeated with a starting material containing 77.3 per cent by weight of vanadium, 7.3 per cent by weight of oxygen, 10.9 per cent by weight of carbon and 3.0 per cent by weight of nitrogen but using pure ammonia gas.

EXAMPLE VIII

A mixture 45 volume per cent of hydrogen, 45 volume per cent of nitrogen and 10 volume per cent of methane was at 1,050°C passed for seven hours, vanadium oxycarbide containing 77.8 per cent vanadium, 10.1 per cent carbon and 10.2 per cent oxygen.

EXAMPLE IX

The procedure of Example VIII was repeated using 8 volume per cent of ethane.

EXAMPLE X

The procedure of Example VIII was repeated using 5 per cent of propane.

Although certain preferred embodiments of the invention have been set forth in detail, the present invention is not in any way limited to these specific embodiments and suitable modifications can be made therefrom without departing from the scope of the invention, as claimed.

The embodiments of the invention in which an exclusive property or privilege is claimed are defined as follows:

1. Process for the preparation of a material consisting mainly of at least one vanadium compound selected from the group consisting of vanadium oxy carbide, vanadium oxy nitride and vanadium oxy carbonitride, the oxygen content ranging from about 0.2 to 1.7 percent wt. having the formula: $VC_xN_yO$, wherein X and Y are in any desired ratio and either may be zero, except that when X is O, Y cannot be zero and conversely, comprising reacting at a temperature ranging from about 800°C to 1,250°C a solid compound defined by the formula $VO_pC_qN_z$, having an oxygen content in the range of about 7.3 to 14.9 percent by wt., wherein p and q may have any ratio to one another and z can range from 0 to 3 percent by wt., with a gas comprising from 0 to 100 volume per cent of hydrogen, 0 to 100 volume per cent of nitrogen, 0 to 100 volume per cent of ammonia, the sum of the hydrogen, nitrogen and ammonia contents constituting at least 50 volume per cent of said gas.

2. The process according to claim 1, wherein natural gas is reacted with vanadium pentoxide to form an intermediate product which is then treated with said gas.

3. The process according to claim 2, wherein said natural gas is passed over said vanadium pentoxide for about 1 hour at 1,050°C.

4. The process according to claim 1, wherein said solid compound is vanadium oxycarbide.

5. The process according to claim 1, wherein said gas contains at least 80 volume per cent of hydrogen, nitrogen, and ammonia the remainder being inert gases.

6. The process according to claim 1, wherein said gas contains up to 10 volume per cent of a hydrocarbon gas selected from the group consisting of methane, ethane and propane.

7. The process according to claim 1, wherein pure hydrogen is used.

8. The process according to claim 1 wherein said gas consists essentially of hydrogen and the resulting product is vanadium carbide.

9. The process according to claim 1 wherein said gas consists essentially of a gas from the group consisting of ammonia and nitrogen and the product is selected from the group consisting of vanadium nitride; a mixture of vanadium carbonitride vanadium carbide, and vanadium nitride; and a mixture of vanadium nitride and vanadium carbide.

10. Process for the preparation of a material consisting mainly of at least one vanadium compound wherein the amount by weight, of C ranges from about 4.7 to 16.0%, the amount of N ranges from about 0 to 14.4% the amount of O ranges from about 0.2 to 1.7 and the amount of V ranges from about 79.1 to 82.6%, which comprises reacting at a temperature in the range from about 800°C to 1,250°C a solid compound wherein the amount, by weight, of V ranges from about 72.2 to 78.7%, the amount of O ranges from about 7.3 to 14.9%, the amount of C ranges from about 10.1 to 16.9%, and the amount of N ranges from about 0 to 3%, with a gas comprising, by volume, 0 to 100% hydrogen, 0 to 100% nitrogen, and 0 to 100% ammonia, the sum of hydrogen, nitrogen and ammonia constituting at least 50% of said gas.

11. Process as defined by claim 10 wherein said temperature is about 1,050°C, wherein said solid compound consists essentially of, by weight, about 77.8% vanadium, about 10.2% carbon, and about 10.1% oxygen, and wherein said gas consists essentially of hydrogen and nitrogen present in the ratio of 1.1.

12. Process as defined by claim 10 wherein natural gas is passed over vanadium pentoxide for about 1 hour at a temperature of about 1,050°C to secure said solid compound.

13. Process as defined by claim 10 wherein said temperature is about 1,050°C, wherein said compound consists essentially of, by weight, about 77.8% vanadium, about 10.2% carbon, and about 10.1% oxygen, wherein said gas consists essentially of hydrogen and nitrogen present in the ratio of 1:1, and wherein said one vanadium compound consists essentially of about, by weight, 81.2% vanadium, 8.5% carbon, 0.5% oxygen, and 8.5% nitrogen.

* * * * *